United States Patent [19]
Wilson

[11] Patent Number: 5,816,642
[45] Date of Patent: Oct. 6, 1998

[54] SUPPORT PIN FOR SUN VISOR

[75] Inventor: Douglas J. Wilson, Jeddo, Mich.

[73] Assignee: Lear Corporation, Southfield, Mich.

[21] Appl. No.: 848,315

[22] Filed: Apr. 30, 1997

[51] Int. Cl.$^6$ ........................................................ B60J 3/02
[52] U.S. Cl. ........................ 296/97.9; 296/97.1; 296/97.9; 248/316.7
[58] Field of Search ................................. 296/97.1, 97.9; 248/316.7, 316.1

[56] References Cited

U.S. PATENT DOCUMENTS

| | | |
|---|---|---|
| 3,035,864 | 5/1962 | Davidson . |
| 3,193,323 | 7/1965 | Herr et al. . |
| 3,542,416 | 11/1970 | Nelson et al. . |
| 3,655,849 | 4/1972 | Hayashi . |
| 4,570,990 | 2/1986 | Flowerday . |
| 4,600,234 | 7/1986 | Jonsas ..................................... 296/97.1 |
| 4,655,498 | 4/1987 | Panzner et al. . |
| 4,664,435 | 5/1987 | Dietz et al. ............................. 296/97.1 |
| 4,679,843 | 7/1987 | Spykerman . |
| 4,681,363 | 7/1987 | Hemmeke et al. . |
| 4,690,450 | 9/1987 | Boerema et al. . |
| 4,707,019 | 11/1987 | Ebert et al. . |
| 4,711,483 | 12/1987 | Gulette et al. . |
| 4,763,946 | 8/1988 | Robbins et al. . |
| 4,867,500 | 9/1989 | Oosterbaan et al. . |
| 5,056,852 | 10/1991 | Miller . |
| 5,374,097 | 12/1994 | George et al. .......................... 296/97.9 |

*Primary Examiner*—Dennis H. Pedder
*Assistant Examiner*—Kiran Patel
*Attorney, Agent, or Firm*—Brooks & Kushman P.C.

[57] ABSTRACT

A support pin for insertion into a material-covered notch in a sun visor. The support pin includes a frame, a retainer pin, a pair of wings, and a pair of spaced keels. The frame has a first surface configured to conform to the notch and a second surface having an appearance finish. The retainer pin extends from one portion of the second surface to another portion of the second surface. The wings extend outwardly from the first surface of the frame and are adapted to sufficiently engage the notch when the support pin is inserted into the notch to hold the material and the pin of the notch. The pair of spaced keels extend from the first surface of the frame and define a groove therebetween. The groove is adapted to straddle and sufficiently receive one portion of the material of the material-covered notch to lessen the stretch of the one portion of the material in the groove as the support pin is inserted into the notch. The keels are configured to stretch uniformly other portions of the material outside the groove locally and independently anywhere along the first surface of the frame as the support pin is inserted into the notch. Alternatively, a nub may be affixed to each of the keels outward of the groove to engage the sun visor when the support pin is inserted into the notch.

16 Claims, 1 Drawing Sheet

U.S. Patent    Oct. 6, 1998    5,816,642

SUPPORT PIN FOR SUN VISOR

TECHNICAL FIELD

This invention relates to sun visors for motor vehicles and, more particularly, to a support pin for a sun visor.

BACKGROUND ART

Visors for blocking the sun and other sources of glare have been standard equipment on motor vehicles for many years. Generally, a visor is mounted to the headliner in front of both the driver and the front seat passenger. Traditionally, the visor has included a support pin to latch the visor to a retaining clip of the headliner. When the support pin is unlatched from the retaining clip, the occupant may pivot the visor to a position away from the front windshield.

Although an integral part of a sun visor, conventional support pins create difficulties during assembly of a visor. Support pins in a "coreless" or unmolded sun visor, that is a visor shaped with folded or hinged piece of cardboard or substrate, require that the material cover be cut and edge-folded around the notch or opening forming the support pin area. This "tabbing" operation requires that an assembler hand stretch and glue the material around the notch. This operation is highly labor intensive and time consuming. Past attempts to automate this operation have been largely unsuccessful.

An alternative solution to "tabbing" is to use a D-ring style support pin. Unfortunately, D-ring pins normally work only with a visor having a molded clamshell core because the D-ring pin requires retention points which may be molded in the clamshell core. More importantly, it is possible to sculpture the area around the notch of the clamshell core so that the material cover is stretched and trapped by the configuration of the plastic core. Prior D-ring pin designs use a single keel to push the material cover down into the clamshell core. As the D-ring pin is inserted into the core, the material covering the notch is stretched downwardly. Thereafter, the clamshell is closed over the pin, locking the pin in place and creating a smooth material cover surface around the notch and sides of the support pin.

Attempts to use a single keel pin with a "coreless" visor were largely unsuccessful because the material represented by line A in FIG. 3 must stretch around the entire periphery of the support pin. With a single keel support pin, the material represented by line A in a coreless visor is under much more stress than the portion of the material represented by line B. This difference in stretch causes the material along both sides of the support pin to sag or wrinkle. In a clamshell core visor, this wrinkle is "absorbed" by the distance that the material must travel around the sculptured surface near the notch after the core is closed. Sculpturing the area around the notch of a coreless visor is difficult. Typically, the wrinkle or sag is transferred to the outside surface of the coreless visor as the visor is closed. The result is an unacceptable loose material fit around the notch and sides of the support pin. Accordingly, there is a need for an improved support pin to overcome the shortcomings of the prior D-ring pin.

SUMMARY OF THE INVENTION

To overcome the shortcomings of the prior D-ring, the present invention is a support pin that allows controlled, independent stretch of all areas of the material around the notch and sides of the support pin. In general, a twin-keel support pin allows a first portion of the material to track in a groove between the keels, which results in less stretch to the first portion of material. Because a second portion of the material must travel around the keels, its stretch is independently controlled by the length of the keels. The shape and size of the keels may be adjusted to allow for localized, independent material stretch anywhere along the periphery of the support pin. Wings and nubs are included to retain the support pin in the visor after the careless cardboard of the visor is folded.

More particularly, the support pin of the present invention comprises a frame, a retainer pin, at least one wing, and a pair of spaced keels. The frame has a first surface configured to conform to a notch in a visor and a second surface having an appearance finish. The retainer pin extends from one portion of the second surface to another portion of the second surface. The at least one wing extends outwardly from the first surface of the frame and is adapted to sufficiently engage the notch when the support pin is inserted into the notch. The pair of spaced keels extend from the first surface of the frame and define a groove therebetween. The groove is adapted to straddle and sufficiently receive one portion of the material of the material-covered notch to lessen the stretch of the one portion of the material in the groove as the support pin is inserted into the notch. The keels are configured to stretch uniformly other portions of the material outside the groove locally and independently anywhere along the first surface of the frame as the support pin is inserted into the notch. Alternatively, a nub may be affixed to at least one of the keels outward of the groove to engage the visor as a retainer or latch when the support pin is inserted into the notch.

Accordingly, it is an object of the present invention to provide an improved support pin which retains and smooths the material to a material-covered sun visor without the use of adhesives.

Another object of the present invention is to provide an improved support pin for a sun visor which reduces the amount of time required to assemble the sun visor.

A more specific object of the present invention is to provide an improved support pin for a sun visor which does not require cutting and gluing of the material covering a corresponding notch in a coreless sun visor.

A more specific object of the present invention is to provide a double keeled snap-in support pin for a notched sun visor which does not cause the material surrounding the notch to sag or wrinkle when the support pin is inserted into the notch.

above objects and other objects, features, and advantages of the present invention will be readily apparent from the following detailed description of the best mode for carrying out the invention when taken in conjunction with the accompanying drawings.

BEST MODE FOR CARRYING OUT THE PRESENT INVENTION

Figure 1:
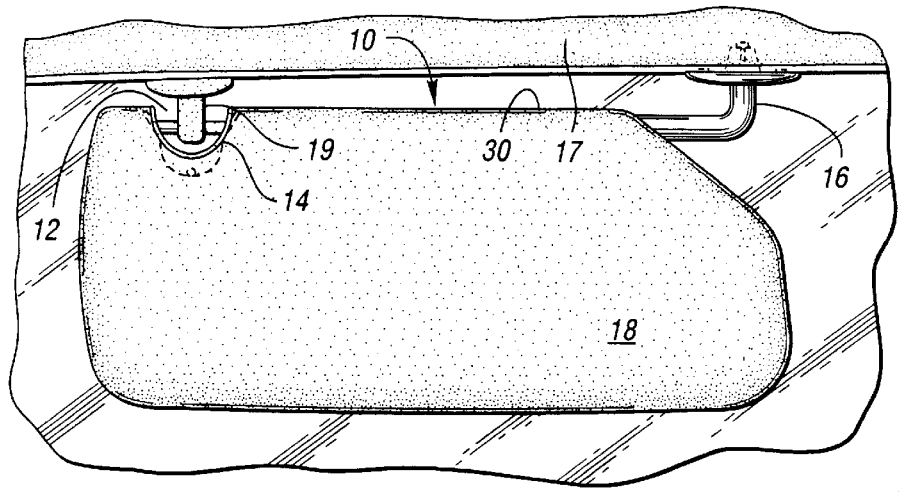
FIG. 1 is an elevational view of a sun visor including a support pin in accordance with the present invention and mounted to the headliner of a motor vehicle.

FIG. 1 shows a sun visor 10 including a support pin 12 in accordance with the present invention. Sun visor 10 further includes a notch or opening 14 to receive support pin 12, an attaching means 16 to fix visor 10 to a vehicle headliner 17, and a material cover 18. The material may comprise a knit jersey material, a bilaminate cloth consisting of a knit jersey material with a thin layer of polyurethane foam flame bonded to one side of the cloth, vinyl, or other suitable material. Support pin 12 may comprise a plastic or other suitable material colored to match or coordinate with cover 18. Support pin 12 is designed to be received in a retaining clip 19 located on headliner 17. Various convenience items such as illumination devices, mirrors, map straps, map pockets, and the like can be mounted to visor 10.

Figure 2:
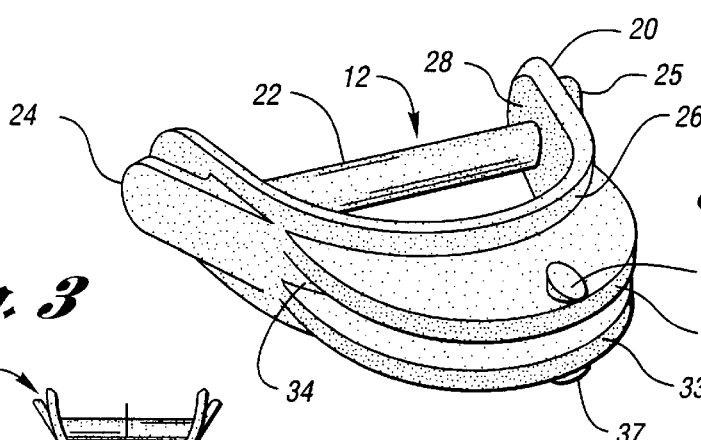
FIG. 2 is a perspective view of the support pin.

FIG. 2 shows a perspective view of support pin 12. Support pin 12 preferably is a one piece injection molded part including a frame 20, a retainer pin 22, and a pair of opposed wings 24 and 25. Frame 20 includes a first surface 26 configured to conform to notch 14 and a second surface 28 having an appearance finish. Retainer pin 22 extends from one portion of second surface 28 to another portion of the second surface 28 in a manner to provide sufficient clearance to receive the retaining clip 19 on the headliner 17. When support pin 12 is properly seated in notch 14, retainer pin 22 is oriented in a position parallel to a top edge 30 of visor 10 as shown in FIG. 1. The pair of opposed wings 24 and 25 are disposed outboard of frame 20. Support pin 12 further includes a pair of keels 32 and 33 which extend outwardly from frame 20 and define a groove or slot 34 therebetween. A sloped nub 36 is centered on each keel 32 and 33 and extends outwardly away from groove 34.

Figure 3:
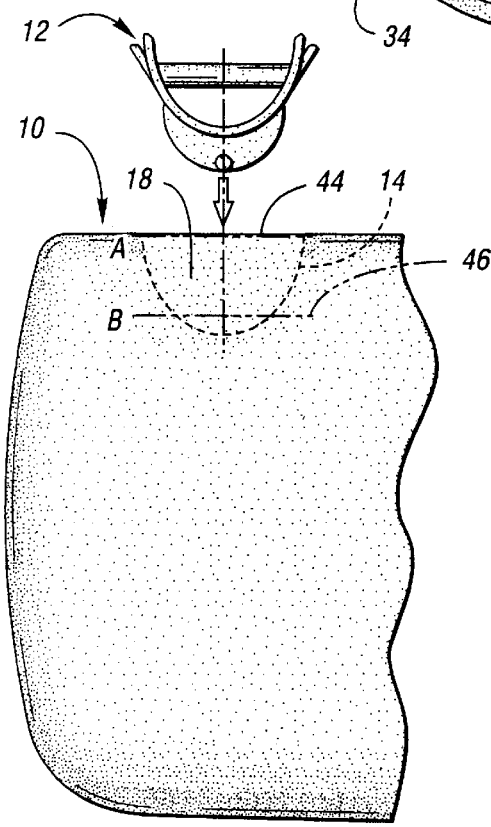
FIG. 3 is a fragmentary elevational view of the sun visor prior to insertion of the support pin.

FIG. 3 shows the sun visor 10 with support pin 12 poised for insertion. At this point in assembly, cover 18 has been disposed about the outer periphery of visor 10. Material covering notch 14 has been neither cut nor glued. Specific insertion stages of the material covering notch 14 have been identified as line A (at start of insertion with material portion 44 in groove 34) and line B (at completion of insertion with portion 44 depressed and material portions 46 and 48 outboard of the material edgefold portion 44 wrapped around and depressed by their respective keels 32 and 33). As support pin 12 is inserted into notch 14, cover 18 bridging the notch is received into groove 34 and the material starts to stretch. Wings 24 and 25 are flexed inward as they contact with the sides of notch 14. Support pin 12 is fully inserted when the first surface 26 of frame 20 abuts the corresponding perimeter of notch 14. At this point, wings 24 and 25 flex back to their original position as shown and engage the sides of the material-covered notch 14, preventing the support pin 12 from being extracted from the sun visor 10.

Material portion 44 represented by line A tracks into groove 34 and is stretched around the first surface 26 of frame 20. Material portions 46 and 48 represented by line B are stretched from their original positions as shown in FIG. 3 around keels 32 and 33. The length of keels 32 and 33, that is the distance from the first surface 26 of frame 20 to a distal end, is designed so that the material represented by line B is stretched the same distance as the material represented by line A. Stretching all portions 44, 46, and 48 of material an equal distance prevents the material at the notch 14 from sagging or wrinkling.

Figure 4:
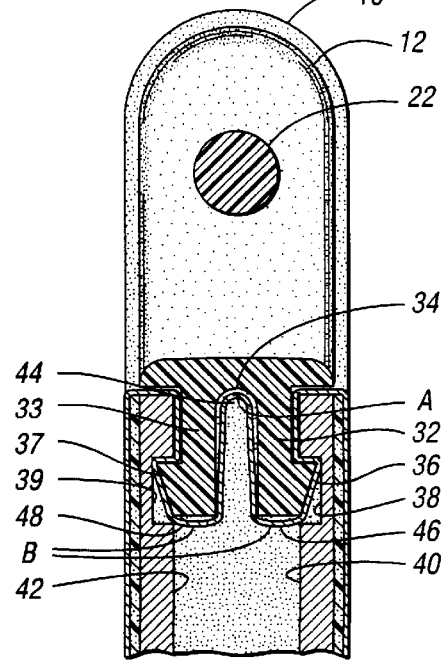
FIG. 4 is a cross-sectional view of the support pin fully inserted in the sun visor.

FIG. 4 shows a cross-sectional view of support pin 12 fully inserted in visor 10. As support pin 12 is inserted into notch 14, nubs 36 and 37 cam inwardly and then snap-fasteningly engage corresponding holes 38 and 39 located in interior cardboard surfaces 40 and 42 of sun visor 10. At full insertion, the slope of nubs 36 and 37 also oppose extraction of the support pin 12.

It is to be understood, of course, that while the form of the invention described above constitutes the best mode contemplated of practicing the present invention, the preceding description is not intended to illustrate all possible forms thereof. It is also to be understood that the words used are words of description, rather than of limitation, and that various changes may be made without departing from the spirit and scope of the present invention, which should be construed according to the following claims.

I claim:

1. A support pin for insertion into a material-covered notch in a coreless sun visor, the support pin comprising:

a frame having a first surface configured to conform to the notch and a second surface having an appearance finish;

a retainer pin extending from one portion of the second surface to another portion of the second surface;

at least one wing extending outwardly from the first surface of the frame and adapted to sufficiently engage the notch when the support pin is inserted into the notch to retain the support pin in the sun visor; and a pair of spaced keels extending from the first surface of the frame, the keels defining a groove therebetween adapted to straddle and sufficiently receive one portion of the material of the material-covered notch to lessen the stretch of the one portion of the material in the groove as the support pin is inserted into the notch, the keels respectively configured to stretch uniformly other portions of the material outside the groove locally and independently anywhere along the first surface of the frame as the support pin is inserted into the notch.

2. The support pin of claim 1 wherein the pair of keels are configured to uniformly stretch other portions of the cover outside the groove locally and independently anywhere along the perimeter as the support pin is inserted into the opening.

3. The support pin of claim 1 further comprising a nub affixed to at least one of the keels outwardly of the groove to engage the sun visor when the support pin is inserted into the opening.

4. The support pin of claim 1 wherein the spaced keels extend in parallel relationship to each other from the perimeter.

5. A support pin for insertion into a sun visor having an opening with a cover thereover, the support pin comprising:

a U-shaped perimeter sized to match the opening;

a retainer pin spanning the U-shaped perimeter;

at least one wing extending outwardly from the perimeter and adapted to sufficiently engage the cover of the opening when the support pin is inserted into the opening to retain the support pin in the sun visor; and a pair of spaced keels extending from the perimeter, the keels defining a groove therebetween adapted to receive one portion of the cover of the opening into the groove as the support pin is inserted into the opening and the wing retains the support pin in the sun visor.

6. The support pin of claim 5 wherein the pair of keels are configured to uniformly stretch other portions of the cover outside the groove locally and independently anywhere along the perimeter as the support pin is inserted into the opening.

7. The support pin of claim 5 further comprising a nub affixed to at least one of the keels outwardly of the groove to engage the sun visor when the support pin is inserted into the opening.

8. The support pin of claim 5 wherein the spaced keels extend in parallel relationship to each other from the perimeter.

9. A vehicle sun visor comprising in combination:

a visor body including a notch;

a stretchable material covering the notch; and an insertable snap-in support pin for smoothly mating the material to the visor body at the notch, the support pin including a frame having a first surface configured to the notch in the body and a second surface having an appearance finish;

a retainer pin extending from one portion of the second surface to another portion of the second surface;

at least one wing extending outwardly from the first surface of the frame to sufficiently engage the notch when the support pin is inserted into the notch to retain the support pin in the body; and a pair of spaced keels extending from the first surface of the frame, the keels defining a groove therebetween which straddles and sufficiently receives one portion of the material covering the notch to lessen the stretch of the one portion of the material in the groove as the support pin is inserted into the notch, the keels uniformly stretching other portions of the material outside the groove locally and independently anywhere along the first surface of the frame as the support pin is inserted into the notch.

10. The sun visor of claim 9 wherein the pair of keels are configured to uniformly stretch other portions of the cover outside the groove locally and independently anywhere along the perimeter as the support pin is inserted into the opening.

11. The sun visor of claim 9 further comprising a nub affixed to at least one of the keels outwardly of the groove to engage the sun visor when the support pin is inserted into the opening.

12. The sun visor of claim 9 wherein the spaced keels extend in parallel relationship to each other from the perimeter.

13. A sun visor for a motor vehicle, comprising:

a visor body substrate having an opening and first and second sides defined by a hinge including the opening;

a stretchable cover covering the opening; and an insertable snap-in support pin for smoothly mating the cover to the visor body substrate at the opening, the support pin including a U-shaped perimeter sized to match the opening;

a retainer pin spanning the U-shaped perimeter;

at least one wing extending outwardly from the perimeter to sufficiently engage the cover of the opening when the support pin is inserted into the opening to retain the support pin in the body; and a pair of spaced keels extending from the perimeter, the keels defining a groove therebetween which receives one portion of the cover of the opening into the groove as the support pin is inserted into the opening and the wing retains the support pin in the visor body substrate.

14. The sun visor of claim 13 wherein the pair of keels are configured to uniformly stretch other portions of the cover outside the groove locally and independently anywhere along the perimeter as the support pin is inserted into the opening.

15. The sun visor of claim 13 further comprising a nub affixed to at least one of the keels outwardly of the groove to engage the sun visor when the support pin is inserted into the opening.

16. The sun visor of claim 13 wherein the spaced keels extend in parallel relationship to each other from the perimeter.

* * * * *